United States Patent
Jiang et al.

(10) Patent No.: US 11,432,545 B2
(45) Date of Patent: Sep. 6, 2022

(54) FAST KILL DISINFECTANT WIPING COMPOSITION AND PREMOISTENED WIPES MADE FROM SAME

(71) Applicant: LONZA, LLC, Morristown, NJ (US)

(72) Inventors: Xiao Jiang, Montvale, NJ (US); Andrew Kaziska, Whitehouse Station, NJ (US)

(73) Assignee: ARXADA, LLC, Morristown, NJ (US)

( * ) Notice: Subject to any disclaimer, the term of this patent is extended or adjusted under 35 U.S.C. 154(b) by 0 days.

(21) Appl. No.: 15/996,714

(22) Filed: Jun. 4, 2018

(65) Prior Publication Data

US 2018/0343859 A1 Dec. 6, 2018

Related U.S. Application Data

(60) Provisional application No. 62/515,027, filed on Jun. 5, 2017.

(51) Int. Cl.

| | | |
|---|---|---|
| *A01N 33/04* | (2006.01) | |
| *A01N 25/30* | (2006.01) | |
| *A01N 25/02* | (2006.01) | |
| *C11D 1/40* | (2006.01) | |
| *C11D 3/48* | (2006.01) | |
| *C11D 17/04* | (2006.01) | |

(52) U.S. Cl.
CPC ............ *A01N 33/04* (2013.01); *A01N 25/02* (2013.01); *A01N 25/30* (2013.01); *C11D 1/40* (2013.01); *C11D 3/48* (2013.01); *C11D 17/049* (2013.01); *A01N 2300/00* (2013.01)

(58) Field of Classification Search
CPC ........ A01N 33/04; A01N 25/30; A01N 25/02; A01N 2300/00; C11D 1/40; C11D 3/48; C11D 17/049
See application file for complete search history.

(56) References Cited

U.S. PATENT DOCUMENTS

| | | | | |
|---|---|---|---|---|
| 4,518,585 A | * | 5/1985 | Greene | ............... A01N 59/00 424/616 |
| 5,030,659 A | | 7/1991 | Bansemir et al. | |
| 5,180,577 A | | 1/1993 | Polefka et al. | |
| 5,330,674 A | * | 7/1994 | Urfer | ............... C11D 3/48 510/384 |
| 5,393,789 A | * | 2/1995 | Eggensperger | ........ A01N 33/04 510/383 |
| 5,492,650 A | | 2/1996 | Lang et al. | |
| 5,547,662 A | | 8/1996 | Khan et al. | |
| 5,641,498 A | | 6/1997 | Loosemore | |
| 5,763,412 A | | 6/1998 | Khan et al. | |
| 5,929,016 A | * | 7/1999 | Harrison | ............... A01N 33/12 510/199 |
| 6,121,224 A | | 9/2000 | Fonsny et al. | |
| 6,159,924 A | | 12/2000 | Weller et al. | |
| 6,281,178 B1 | | 8/2001 | Ryklin et al. | |
| 6,303,557 B1 | | 10/2001 | Colclough | |
| 7,148,187 B1 | | 12/2006 | Simon et al. | |
| 7,217,759 B2 | | 5/2007 | Hodge et al. | |
| 7,345,015 B1 | | 3/2008 | Kong et al. | |
| 7,414,017 B2 | | 8/2008 | Kong et al. | |
| 7,598,214 B2 | | 10/2009 | Cusack et al. | |
| 7,723,281 B1 | | 5/2010 | Herdt et al. | |
| 7,807,616 B2 | | 10/2010 | Meine et al. | |
| 7,888,404 B2 | | 2/2011 | Kritzler | |
| 8,003,593 B2 | | 8/2011 | Schwarz et al. | |
| 8,592,358 B2 | | 11/2013 | Beilfuss et al. | |
| 8,801,962 B2 | | 8/2014 | Giles et al. | |
| 8,980,818 B2 | | 3/2015 | Wates et al. | |
| 9,096,821 B1 | | 8/2015 | Hope et al. | |
| 9,655,367 B2 | | 5/2017 | Colurciello et al. | |
| 2002/0039979 A1 | | 4/2002 | Aszman et al. | |
| 2003/0100465 A1 | | 5/2003 | Kilkenny et al. | |
| 2006/0247150 A1 | | 11/2006 | Molinaro et al. | |
| 2008/0010772 A1 | | 1/2008 | Kong et al. | |
| 2009/0041849 A1 | | 2/2009 | New | |
| 2009/0042870 A1 | | 2/2009 | Fellows et al. | |
| 2009/0203645 A1 | | 8/2009 | Hall et al. | |
| 2010/0240799 A1 | | 9/2010 | Hofmann et al. | |
| 2011/0117032 A1 | | 5/2011 | Gilding | |
| 2012/0171300 A1 | | 7/2012 | Koenig et al. | |
| 2013/0261044 A1 | * | 10/2013 | Lambert | ............... C11D 3/0036 510/400 |
| 2014/0171512 A1 | | 6/2014 | Kloeppel et al. | |
| 2015/0314471 A1 | | 11/2015 | Thompson et al. | |
| 2016/0058012 A1 | | 3/2016 | Herdt et al. | |
| 2016/0066571 A1 | * | 3/2016 | Lei | ......................... A01N 37/02 424/605 |
| 2017/0347644 A1 | | 12/2017 | Silvernail et al. | |
| 2018/0084777 A1 | | 3/2018 | Jiang | |
| 2018/0132481 A1 | | 5/2018 | Jiang et al. | |

FOREIGN PATENT DOCUMENTS

| | | |
|---|---|---|
| DE | 19636114 | 12/1998 |
| DE | 102006051559 | 5/2008 |

(Continued)

OTHER PUBLICATIONS

PCT/US2018/035804 International Search Report and Written Opinion dated Jul. 30, 2018.

(Continued)

*Primary Examiner* — Sean M Basquill

(74) *Attorney, Agent, or Firm* — Dority & Manning, P.A.

(57) ABSTRACT

Wiping compositions are disclosed well suited for destroying various different microorganism very quickly. The wiping composition contains a tertiary alkyl amine biocide in combination with one or more other components. The wiping composition, for instance, may contain a pH adjustor, chelating agent, one or more surfactants, and water as a liquid carrier. In one embodiment, the composition can be formulated to contain various organic solvents that increase efficacy against mycobacteria. The wiping composition is particularly well suited to being impregnated into a disposable wipe.

18 Claims, 1 Drawing Sheet

(56) References Cited

FOREIGN PATENT DOCUMENTS

| | | | |
|---|---|---|---|
| DE | 102006051560 | 5/2008 | |
| EP | 0333143 | 9/1989 | |
| EP | 0343605 | 11/1989 | |
| EP | 0848907 | 6/1998 | |
| EP | 0898611 | 5/2001 | |
| EP | 1865049 | 12/2007 | |
| EP | 3015538 | 4/2016 | |
| EP | 3015538 A1 * | 5/2016 | ............. C11D 1/835 |
| WO | WO 03038022 | 5/2003 | |
| WO | WO-2017210392 A1 * | 12/2017 | ............. A01N 25/22 |

OTHER PUBLICATIONS

Product Information—Lonzabac® 12, Lonza, revised Jan. 11, 2008, 1 page.

* cited by examiner

FAST KILL DISINFECTANT WIPING COMPOSITION AND PREMOISTENED WIPES MADE FROM SAME

RELATED APPLICATIONS

The present application is based on and claims priority to U.S. Provisional Application Ser. No. 62/515,027, having a filing date of Jun. 5, 2017, which is incorporated herein by reference in its entirety.

BACKGROUND

Pathogenic organisms, such as bacteria, fungi, and viruses, continue to cause infections in humans as well as domestic animals and pets. Disinfectant formulations have been developed over the last several decades to reduce or destroy pathogenic organisms and accordingly, reduce the rate of infection. Literally any hard surface including floors, walls, countertops, windows, windowsills, sinks, faucets, waste containers, appliances, and cabinet surfaces can become contaminated. Disinfectants have been developed to treat hard surfaces for use in hospitals, rest homes, schools, and homes. Antimicrobial compositions for decontamination, disinfection and/or sanitization can be added to wipes in order to treat such surfaces.

One particular class of antimicrobial compositions includes quaternary ammonium compounds, also known as "quats", as a microbial control agent. The use of quats as biocides is well known.

In hard surface cleaning/disinfecting wipe applications, a desired product should be capable of killing and destroying microorganisms with a very short contact time. Disinfecting wipes should also exhibit good cleaning performance and at the same time leave the surface visually clean of spots, streaks, and films.

In one application, the antimicrobial composition may be incorporated into a wiping product and packaged as a premoistened wipe. These products are generally inexpensive to manufacture, are easy to use, and are disposable after use. Problems with streaking and film residue, however, are exacerbated when using premoistened wipes in that the products leave the surfaces in a wet state and are not dry wiped. In addition, antimicrobial compositions used in the past typically require significant amounts of time in order to kill the microorganisms.

The present disclosure is directed to a wiping composition and/or to premoistened wipes containing a wiping composition that has dramatically improved kill rates. The wiping composition, for instance, can have relatively short contact times while having efficacy against many microorganisms. The wiping composition of the present disclosure is also capable of short contact times with reduced streaking.

SUMMARY

In general, the present disclosure is directed to a wiping composition having antimicrobial properties. The wiping composition contains a biocide comprising a tertiary amine, such as a tertiary alkyl amine. The biocide can be present within the wiping composition in combination with various other components such as organic solvents, an alkanolamine, an evaporating agent, one or more surfactants, and/or a liquid carrier. The wiping composition is for disinfecting hard surfaces. Of particular advantage, the wiping composition of the present disclosure not only demonstrates quick disinfecting performance against many hospital grade microorganisms such as *Staphylococcus aureus* and *Pseudomonas aeruginosa* but can also produces no visible streaking on hard surfaces. The wiping composition of the present disclosure has also been found to be very efficient at killing tuberculosis-causing bacteria. For instance, when combined with different organic solvents, the wiping composition can achieve quick efficacy against *Mycobacterium tuberculosis*.

In one embodiment, for instance, the wiping composition of the present disclosure having reduced streaking characteristics comprising at least one biocide. The biocide comprises a N, N-bis(3-aminopropyl) dodecylamine, N-(3-aminopropyl)-N-dodecylpropane-1,3-diamine, N-(3-aminopropyl)-N-decyl-1,3-propanediamine, N-(3-aminopropyl)-N-tetradecyl-1,3-propanediamine, or mixtures thereof. The biocide is generally present in the wiping composition in an amount from about 0.05% to about 2% by weight, such as in an amount from about 0.1% to about 2% by weight, such as in an amount from about 0.2% to about 1.5% by weight, such as in an amount from about 0.3% to about 1.2% by weight.

The biocide contained in the wiping composition can be combined with various additives and components depending upon the particular application and the desired results. In one embodiment, the composition further contains at least one organic solvent. The organic solvent, for instance, may comprise a glycol ether. The glycol ether can be present in the composition in an amount from about 0.05% to about 25% by weight, such as in an amount from about 0.08% to about 20% by weight, such as in an amount from about 5% to about 15% weight. The glycol ether, for instance, may comprise dipropylene glycol n-propyl ether, ethylene glycol phenol ether, propylene glycol n-butyl ether, or mixtures thereof.

In one embodiment, the wiping composition contains an evaporating agent that helps the composition evaporate from hard surfaces. The evaporating agent, for instance, can have a boiling point of less than about 90° C., such as less than about 85° C., at 1 ATM. In one embodiment, the evaporating agent comprises an alcohol. The alcohol may comprise isopropyl alcohol and/or ethanol. The evaporating agent can be present in the composition generally in an amount from about 1% to about 60% by weight, such as an amount from about 5% to about 35% by weight.

In an alternative embodiment, the composition can be alcohol-free.

In one embodiment, the wiping composition can further contain a liquid carrier. The liquid carrier, for instance, may comprise water. Water can be present in the wiping composition in an amount of greater than about 20% by weight, such as in an amount greater about 30% by weight, such as in an amount greater than about 40% by weight, such as in an amount greater than about 50% by weight. Water is generally present in an amount less than about 70% by weight, such as in an amount less than about 65% by weight.

One or more surfactants can also be present in the wiping composition. The one or more surfactants may comprise, for instance, nonionic surfactants, cationic surfactants, and mixtures thereof. In one embodiment, a surfactant is present comprising an ethoxylated alcohol. The ethoxylated alcohol, for instance, may comprise an ethoxylated C12 to C14 alkyl alcohol. In an alternative embodiment, the surfactant that may be present in the composition comprises an amine oxide nonionic surfactant, such as a cocamine oxide surfactant. The composition can contain a nonionic surfactant alone or in combination with a cationic surfactant. A suitable cationic surfactant that may be present is a quaternary ammonium compound such as an alkyl trimethyl ammonium salt. Each surfactant can generally be present in the composition in an amount from about 0.01% to about 2% by weight.

In yet another embodiment, the wiping composition may further contain a chelating agent. The chelating agent, for instance, may comprise tetrasodium EDTA. The chelating agent can generally be present in the composition in an amount from about 0.01% to about 2% by weight.

In still another embodiment of the present disclosure, the wiping composition may further contain a pH adjustor. The pH adjustor, for instance, may be added in order to increase or decrease the pH of the composition. When increasing the pH, pH adjustors that may be used in accordance with the present disclosure include alkanolamines such as monoethanolamine, hydroxides such as alkali or alkaline earth metal hydroxides, carbonates, bicarbonates, borates, silicates such as metasilicate, or mixtures thereof. Particular pH adjustors can include, for instance, sodium hydroxide, potassium hydroxide, sodium carbonate, and the like. In one embodiment, a pH adjustor is added in order to increase the pH. For example, in one embodiment, the composition can have a pH of greater than about 10, such as greater than about 10.3, such as greater than about 10.5, such as greater than about 10.7, such as greater than about 11, such as greater than about 11.3, such as greater than about 11.5, such as greater than about 11.7.

In an alternative embodiment, a pH adjustor can be added in order to decrease the pH. In this embodiment, for instance, the pH adjustor may comprise an acid, such as an organic acid. When decreasing the pH, for instance, the composition can have a pH of less than about 9, such as less than about 8.5, such as less than about 8, such as less than about 7.5, and generally greater than about 6.5, such as greater than about 7.

In one embodiment, the wiping composition is formulated so as to be free of any quaternary ammonium compounds. Alternatively, a quaternary ammonium biocide may be present.

For instance, the quaternary ammonium cation or biocide may comprise a halide salt of a quaternary ammonium cation. Particular examples of quaternary ammonium cations include an alkyl dimethyl benzyl ammonium chloride, a dialkyl dimethyl ammonium chloride, an alkyl dimethyl ethyl benzyl ammonium chloride, or mixtures thereof.

In an alternative embodiment, the quaternary ammonium cation can comprise a carbonate/bicarbonate salt of a quaternary ammonium cation.

In one embodiment, the present disclosure is directed to a premoistened wiping product containing the wiping composition described above. The premoistened wiping product may comprise a liquid absorbent substrate impregnated with the wiping composition. The liquid absorbent substrate may comprise a melt blown web, a coform web, a spunbond web, an airlaid web, and airlaced web, a hydroentangled web, a bonded carded web, or a laminate thereof.

In one embodiment, the wiping composition is particularly formulated for cleaning floors. For instance, the wiping composition can have a pH of from about 6.5 to about 9 in order to prevent the composition from adversely interfering with floor finishes. In this embodiment, the wiping composition can be applied to a liquid absorbent substrate impregnated with the wiping composition. The liquid absorbent substrate can be secured to a substrate holder connected to a handle for cleaning floors.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
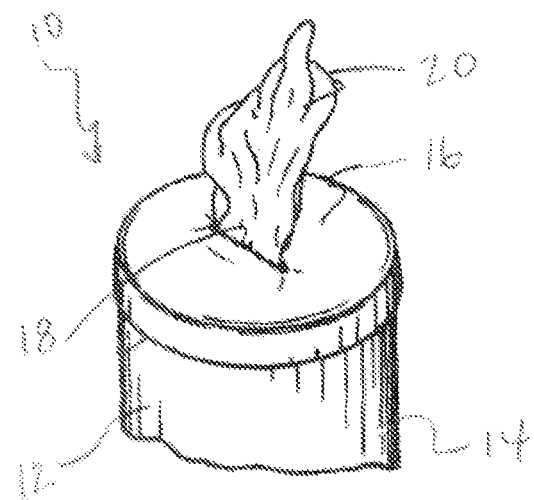
FIG. 1 is a perspective view with cutaway portions of one embodiment of a wiping product made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

An antimicrobial composition is generally disclosed that has extremely short contact times while remaining effective against many different microorganisms. For instance, antimicrobial compositions formulated in accordance with the present disclosure can kill microorganisms almost instantaneously. In addition, the antimicrobial composition can also be formulated to prevent or inhibit streaking. The antimicrobial composition may be used to impregnate a cleaning wipe. The antimicrobial wiping composition generally comprises a biocide comprising a tertiary amine in combination with various other components. For instance, the wiping composition can further optionally contain one or more organic solvents, such as one or more glycol ethers. The composition can also contain a pH adjustor, a chelating agent, a liquid carrier, and one or more surfactants. The composition has been found to unexpectedly and dramatically kill microorganisms very quickly with relatively short contact times.

The wiping composition of the present disclosure demonstrates quick disinfecting performance (fast kill) against many and various different types of microorganisms, such as *Staphylococcus aureus* and *Pseudomonas aeruginosa*. Of particular advantage, the wiping composition of the present disclosure has also been found to be particularly efficient at killing tuberculosis-causing bacteria in addition to providing rapid disinfecting properties after application to a surface. For instance, the wiping composition has displayed quick efficacy against *Mycobacterium tuberculosis*.

As described above, the composition contains at least one biocide. The biocide, for instance, can comprise an amine.

Suitable amines include, but are not limited to, tertiary amines, such as (C6-C16) alkyl amines. The term "(C6-C16) alkyl amine" encompasses all amines which contain a (C6-C16) alkyl group. One (C6-C16) alkyl amine is N,N-bis(3-aminopropyl)dodecylamine, available as Lonzabac® 12.30 and 12.100 from Lonza, Inc. The chemical structure for N, N-Bis (3-aminopropyl) dodecylamine is as follows:

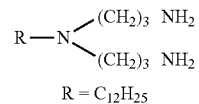

Other exemplary tertiary amines include, for example, N-(3-aminopropyl)-N-dodecyl propane-1,3-diamine, N-(3-aminopropyl)-N-decyl-1,3-propanediamine, N-(3-aminopropyl)-N-tetradecyl-1,3-propanediamine as well as their acid addition compounds. Other similar tertiary amines may be used.

In general, a tertiary amine is present in the composition in an amount greater than about 0.05% by weight, such as in an amount greater than about 0.1% by weight, such as in an amount greater than about 0.2% by weight, such as in an amount greater than about 0.3% by weight. The tertiary amine is generally present in an amount less than about 2% by weight, such as in an amount less than about 1.5% by weight, such as in an amount less than about 1.2% by weight, such as in an amount less than about 1% by weight.

In one embodiment, the wiping composition of the present disclosure contains only a single biocide. For instance, the composition can contain a tertiary amine and can be free of any quaternary ammonium biocides. Alternatively, one or more quaternary ammonium compounds may be present in the composition in conjunction with the tertiary amine. If present in the composition, however, the quaternary ammonium compounds are included at levels that do not cause streaking to occur. For instance, one or more quaternary ammonium compounds can be present in the composition in an amount less than about 1% by weight, such as in an amount less than about 0.6% by weight, such as in an amount less than about 0.4% by weight, such as in an amount less than about 0.3% by weight, such as in an amount less than about 0.2% by weight. One or more quaternary ammonium compounds, for instance, can be present in the composition in an amount greater than about 0.01% by weight, such as in an amount greater than about 0.05% by weight, such as in an amount greater than about 0.08% by weight.

Suitable quaternary ammonium compounds include, but are not limited to, alkyldimethylbenzyl ammonium chlorides, dialkylmethylbenzyl ammonium chlorides, dialkyldimethylammonium chlorides, alkyl dimethyl ethylbenzyl quaternary ammonium chlorides, benzethonium chloride and any combination of any of the foregoing.

In one embodiment, the quaternary ammonium compound may comprise a dialkyl ammonium compound, such as a dimethyl dialkyl ammonium compound. In one embodiment, the dimethyl dialkyl ammonium compound may have between about 8 and about 12 carbon atoms, such as from about 8 to about 10 carbon atoms in each of the alkyl groups.

Examples of dimethyl dialkyl ammonium compounds include dimethyl dioctyl ammonium compounds such as dimethyl dioctyl ammonium chloride, dimethyl didecyl ammonium compounds such as dimethyl didecyl ammonium chloride and the like. Mixtures of dimethyl dialkyl ammonium compounds may also be used, and other anions, such as those described above, may also be used. Commercially available dimethyl dialkyl ammonium compounds include, for example, compositions marketed and sold under the BARDAC®, BARQUAT® or CARBOQUAT® trade names by Lonza Inc.

Such commercially available examples of dimethyl dialkyl ammonium compounds include dioctyldimethylammonium chloride (available as Bardac® LF and LF-80 from Lonza, Inc.), octyldecyldimethylammonium chloride (available as a mixture of octyldecyldimethylammonium chloride, dioctyldimethylammonium chloride, and didecyldimethyl ammonium chloride as Bardac® 2050 and 2080 from Lonza, Inc.), didecyldimethylammonium chloride (available as Bardac® 2250 and 2280 from Lonza, Inc.), decylisononyldimethylammonium chloride (available as Bardac® 21 from Lonza, Inc.), diisodecyldimethylammonium chloride (available as BTC 99 from Stepan Co. of Northfield, Ill.), and any combination of any of the foregoing.

In an alternative embodiment, the quaternary ammonium compound may comprise a benzyl ammonium compound, such as an alkyl dimethyl benzyl ammonium compound. In general, the alkyl group may contain from about 10 to about 18 carbon atoms, such as from about 12 to about 16 carbon atoms.

Examples of alkyl dimethyl benzyl ammonium compounds useable as the first biocide include $C_{12}$ alkyl dimethyl benzyl ammonium chloride, $C_{14}$ alkyl dimethyl benzyl ammonium chloride, and $C_{16}$ alkyl dimethyl benzyl ammonium chloride. In addition, a mixture of these alkyl dimethyl benzyl ammonium compounds can be used. Commercially available alkyl dimethyl benzyl ammonium compounds include, for example, compositions marketed and sold under the BARQUAT® trade name by Lonza Inc. These commercially available alkyl dimethyl benzyl ammonium compounds are blends of $C_{12}$, $C_{14}$, and $C_{16}$ alkyl dimethyl benzyl ammonium chlorides. Generally, it is preferable that the alkyl dimethyl benzyl ammonium compound, when a blend, contains higher concentrations of $C_{12}$ alkyl and $C_{14}$ alkyl components than $C_{16}$ alkyl components. It is noted that other anions, including those mentioned above may also be used.

Non-limiting examples of alkyldimethylbenzyl ammonium chlorides include alkyl ($C_{14}$ 50%; $C_{12}$ 40%, $C_{16}$ 10%) dimethylbenzyl ammonium chloride (available as Barquat® MB-50 and MB-80 from Lonza Inc.), alkyl ($C_{14}$ 60%; $C_{16}$ 30%; $C_{12}$ 5%. $C_{18}$ 5%) dimethylbenzyl ammonium chloride (available as Barquat® 4280Z from Lonza, Inc.), ($C_{12}$-$C_{18}$ alkyl) dimethylbenzyl ammonium chloride, and any combination of any of the foregoing.

In still another embodiment, the antimicrobial agent may comprise a quaternary ammonium carbonate. In one embodiment, the ammonium quaternary compound contained in the composition comprises a di C8 to C12 alkyl ammonium carbonate/bicarbonate. For example, in one particular embodiment, the antimicrobial agent comprises didecyl dimethyl ammonium carbonate and didecyl dimethyl ammonium bicarbonate.

In other embodiments, however, the carbonate/bicarbonate salts of quaternary ammonium cations may be selected from dioctyldimethylammonium carbonate, decyloctyldimethylammonium carbonate, benzalkonium carbonate, benzethonium carbonate, stearalkonium carbonate, cetrimonium carbonate, behentrimonium carbonate, dioctyldimethylammonium bicarbonate, decyloctyldimethylammonium bicarbonate, benzalkonium bicarbonate, benzethonium bicarbonate, stearalkonium bicarbonate, cetrimonium bicarbonate, behentrimonium bicarbonate, and mixtures of one or more such carbonate salts.

It should be understood that the quaternary ammonium compound may comprise more than one specific quaternary ammonium species and may comprise a combination of any of the above described quaternary ammonium compounds.

In addition to at least one biocide, the disinfectant composition can also include a liquid carrier. The liquid carrier, for instance, may comprise a polar solvent such as water. The liquid carrier is generally present in the composition in an amount greater than about 20% by weight, such as an amount greater than about 30% by weight, such as an amount greater than about 40% by weight, such as an amount greater than about 50% by weight, such as an amount greater than about 60% by weight, such as an amount greater than about 70% by weight, such as an amount greater than about 80% by weight, such as an even an amount greater than about 90% by weight. In general, the liquid carrier is present in an amount less than about 99% by weight, such as an amount less than about 97% by weight, such as an amount less than about 80% by weight depending upon the particular application and formulation.

In addition to a liquid carrier, the wiping composition can also optionally contain one or more organic solvents. The organic solvent, for instance, may comprise a glycol ether. Examples of organic solvents include, phenoxyethanol, diethylene glycol propyl ether, ethylene glycol monomethyl ether, ethylene glycol monoethyl ether, ethylene glycol monopropyl ether, ethylene glycol monoisopropyl ether, ethylene glycol monobutyl ether, diethylene glycol monomethyl ether, diethylene glycol monobutyl ether, diethylene glycol monoethyl ether, diethylene glycol n-butyl ether, ethylene glycol dimethyl ether, ethylene glycol diethyl ether, ethylene glycol dibutyl ether, propylene glycol n-butyl ether, propylene glycol n-propyl ether, tripropylene glycol methyl ether, dipropylene glycol methyl ether, dipropylene glycol butyl ether, dipropylene glycol n-propyl ether, ethylene glycol hexyl ether and combinations thereof. In one embodiment, for instance, the organic solvent present in the composition comprises dipropylene glycol n-propyl ether, ethylene glycol phenyl ether, or mixtures thereof.

The presence of one or more organic solvents can provide various advantages and benefits. For example, adding one or more organic solvents to the composition can increase the efficacy of the composition against various microorganisms and bacteria. In particular, it is believed that including organic solvents can improve the efficiency of the composition in killing tuberculosis-causing bacteria and provide rapid disinfecting properties after application to a surface. For instance, it was discovered that combining a tertiary amine with different organic solvents achieve quick efficacy against *Mycobacterium tuberculosis*. For example, formulations made according to the present disclosure demonstrated efficient killing of mycobacteria after 3 minutes of contact time or even lower.

When present in the composition, one or more organic solvents can be included in amounts generally greater than about 0.05% by weight, such as in amounts greater than about 2% by weight, such as in amounts greater than about 4% by weight, such as in amounts greater than about 6% by weight, such as in an amount greater about 8% by weight, such as in amounts greater than about 10% by weight. One or more organic solvents are generally present in the amount less than about 25% by weight, such as in an amount less than about 20% by weight, such as in an amount less than about 15% by weight.

In addition to a glycol ether organic solvent, the wiping composition of the present disclosure can also contain an evaporating agent. The evaporating agent can be present in the composition in order to facilitate evaporation of the composition once applied to a surface. The evaporating agent, for instance, generally has a boiling point of less than liquid water. For instance, the boiling point of the evaporating agent can be less than about 90° C., such as less than about 85° C. at 1 ATM. Examples of evaporating agents include alcohols. For instance, the evaporating agent can comprise ethanol, propanol, isopropanol, and mixtures thereof. The amount of evaporating agents contained in the composition can vary widely depending upon various factors. For example the evaporating agent can be present in the composition in an amount greater than about 0.5% by weight, such as an amount greater than about 1% by weight, such as an amount greater than about 2% by weight, such as an amount greater than about 5% by weight, such as an amount greater than about 10% by weight, such as an amount greater than about 15% by weight, such as an amount greater than about 20% by weight. The evaporating agent is generally present in amount less than about 60% by weight, such as in an amount less than about 50% by weight, such as in an amount less than about 40% by weight, such as in an amount less than about 35% by weight, such as in an amount less than about 30% by weight, such as in an amount less than about 20% by weight.

Although, in some applications, an evaporating agent may be desired, in other embodiments, the composition can be formulated so as to contain no evaporating agents. For instance, in one embodiment, the wiping composition can be alcohol-free.

In one embodiment, the wiping composition may also contain a pH adjustor. For example, a pH adjustor may be added to the composition in order to increase or decrease the pH. When increasing the pH, in one embodiment, the pH adjustor may comprise an alkanolamine. Other examples of pH adjustors include hydroxides such as alkali and alkaline earth metal hydroxides, carbonates, silicates, bicarbonates, and mixtures thereof. Particular alkanolamines that may be used as the pH adjustor include monoethanolamine, 1-Amino-2-Propanol, 3-Amino-1-Propanol, 2-(methylamino)ethanol, 2-(ethylamino)ethanol, 2(propylamino)ethanol, 2(isopropylamino)ethanol, diethanolamine, triethanolamine, diisopropanolamine, triisopropanolamine, or mixtures thereof.

The wiping composition of the present disclosure can generally have a basic pH. For instance, the pH can generally be greater than about 10, such as greater than about 10.3, such as greater than about 10.5, such as greater than about 10.6, such as greater than about 11, such as greater than about 11.2, such as greater than about 11.5, such as greater than about 11.7, such as greater than about 12, such as greater than about 12.2. The pH of the wiping composition is generally less than about 14, such as less than about 13.8, such as less than about 13.5.

In an alternative embodiment, a pH adjustor can be added to the composition in order to decrease the pH. In this embodiment, for instance, the wiping composition can have a pH of less than about 10, such as less than about 9, such as less than about 8.5, such as less than about 8, such as less than about 7.5, and generally greater than about 6.5, such as greater than about 7. In one embodiment, for instance, the pH can be from about 7.1 to about 8.5.

Various different pH adjustors can be used in order to decrease the pH of the composition. In general, any suitable acid, acid salt, or acidic substance can be used to lower the pH. For instance, the pH adjustor may comprise an organic acid. Organic acids include, for instance, saturated, linear aliphatic fatty acids. In one embodiment, the acid is a C1 to C8 carboxylic acid. The acid can be a monocarboxylic acid, a dicarboxylic acid, a tricarboxylic acid, or a mixture thereof. In an additional embodiment, the acid may be hydroxyacid, an aromatic acid, or a mixture thereof. In another additional embodiment, the acid is methanesulfonic acid, phosphoric acid, etidronic acid, phytic acid, phosphoacetic acid, N-(phosphonomethyl)iminodiacetic acid, diethylenetriaminepentakis(methylphosphonoic acid), S,S-ethylenediamine-N'N'-disuccinic acid, their alkaline salts, or any mixture thereof.

In some embodiments, the acid is citric acid, phosphoric acid, succinic acid, lactic acid, S,S-ethylenediamine-N,N'-disuccinic acid, 1-hydroxyethane 1,1-diphosphonic acid (HEDP), dipicolinic acid (DPA), methanesulfonic acid (MSA), their alkaline salts, ethylenediaminetetra acetic acid (EDTA), or any mixture thereof.

In one embodiment, the acid is a mixture of acids. In some embodiments, the acid comprises one or more of the following organic acids: citric acid, succinic acid, phosphoric acid, and lactic acid. In another embodiment, the acid comprises one or more of the following acids: citric acid, succinic acid, phosphoric acid, and lactic acid, in combination with another acid. For example, citric acid may be used in combination with ethylenediamine-N,N'-disuccinic acid or its alkaline salt, HEDP, and/or MSA. As another example, succinic acid may be used in combination with ethylenediamine-N,N'-disuccinic acid or its alkaline salt, HEDP, and/or MSA. As another example, phosphoric acid may be used in combination with ethylenediamine-N,N'-disuccinic acid or its alkaline salt, HEDP, and/or MSA. As another example, lactic acid may be used in combination with ethylenediamine-N,N'-disuccinic acid or its alkaline salt, HEDP, and/or MSA.

When present, one or more pH adjustors can be included in the composition in an amount greater than about 0.001% by weight, such as in an amount greater than about 0.01%, such as in an amount greater than about 0.02% by weight, such as in an amount greater than about 0.1% by weight, such as in an amount greater than about 0.2% by weight, such as in an amount greater than about 0.3% by weight. One or more pH adjustors can generally be present in an amount less than about 5% by weight, such as in an amount less than 3% by weight, such as in an amount less than about 2% by weight, such as in an amount less than about 1% by weight.

In one embodiment, the wiping composition of the present disclosure may also contain a surfactant. Any suitable surfactant may be added to the composition including non-ionic surfactants and/or cationic surfactants. The surfactant can generally be present in the composition in an amount greater than about 0.05% by weight, such as an amount greater than about 0.08% by weight. Surfactants are generally present in an amount less than about 20% by weight, such as an amount less than about 15% by weight, such as an amount less than about 10% by weight, such as an amount less than about 5% by weight, such as an amount less than about 3% by weight, such as an amount less than about 2% by weight.

In one embodiment, the disinfectant composition contains an alkoxylated alcohol surfactant. For example, the alkoxylated alcohol may comprise an alkoxylated fatty alcohol.

For example, useful alkoxylated alcohols include alkoxylates of capryl alcohol, octanol, pelargonic alcohol, decyl alcohol, capric alcohol, undecyl alcohol, 1-undecanol, undecanol, hendecanol, lauryl alcohol, tridecyl alcohol, dodecanol, myristyl alcohol, pentadecyl alcohol, cetyl alcohol, palmitoleyl alcohol, heptadecyl alcohol, or stearyl alcohol.

The degree of alkoxylation in the surfactant can vary depending upon various factors. In one embodiment, for instance, the alkoxylated alcohol contains at least about 5 mols of alkoxylate, such as at least about 8 mols of alkoxylate, such as at least about 10 mols of alkoxylate, such as at least about 12 mols of alkoxylate, such as at least about 15 mols of alkoxylate, such as at least about 18 mols of alkoxylate, such as at least about 20 mols of alkoxylate. The degree of alkoxylation is generally less than about 80 mols, such as less than about 60 mols, such as less than about 40 mols, such as less than about 30 mols.

In one embodiment, the wiping composition can contain a nonionic amine oxide surfactant. The amine oxide surfactant, for instance, may comprise an N-alkyl(C12-C16)dimethylamine oxide. In one embodiment, the surfactant may comprise cocamine oxide.

In other embodiments, the wiping composition may contain a nonionic surfactant alone, a cationic surfactant alone, or can contain a mixture of a nonionic surfactant and a cationic surfactant. In one embodiment, the cationic surfactant is a quaternary ammonium compound. The quaternary ammonium surfactant, for instance, may comprise an alkyl trimethyl ammonium salt. The salt anion may be an inorganic or an organic anion. Exemplary anions include halides, such as chloride or bromide. Other anions include carbonates, bicarbonates, carboxylates, sulfonates, phosphates or mixtures thereof. The alkyl group can contain at least eight carbon atoms. In one embodiment, the alkyl group contains from about 10 to about 28 carbon atoms. One particular cationic surfactant that may be used is N-cocoN, N,Ntrimethylammonium chloride.

The composition may also contain a chelating agent. Suitable chelating agents include, but are not limited to, ethylene diamine tetra acetic acid (EDTA) and salts thereof (e.g., tetrasodium EDTA available as Versene 100® from Dow Europe S.A. of Horgen, Switzerland), diammonium ethylene diamine tetraacetate, aminocarboxylic acids, amino phosphonic acids, fatty acid salts, mixtures thereof, and the like. Amino phosphonic acids include ethylene diaminetetramethylene phosphonic acid, diethylene triamine penta (methylene phosphonic acid), ethylene diamine tri (methylene phosphonic acid), and hexamethylene diaminetetra(methylene phosphonic acid). In general, preferred chelating agents include methylglycinediacetic acid (MGDA), glutamic acid, N,N-diacetic acid (GLDA), iminodisuccinic acid (IDS); ethylenediaminetetraacetic acid (EDTA) diethylenetriaminepentaacetic acid (DTPA), diethylenethaminepenta-methylene phosphonic acid (DETPMP), hydroxyethyliminodiacetic acid (HEIDA), Nitrilothacetic acid (NTA), aspartic acid diethoxysuccinic acid (AES), aspartic acid-N, N-diacetic acid (ASDA), diethylenethaminepentamethylene-phosphonic acid (DTPMPA), hydroxyethylenediaminetetraacetic acid (HEDTA), hydroxyethylethylenediaminetriacetic acid (HEEDTA), iminodifumaric (IDF), iminoditartahc acid (IDT), iminodimaleic acid (IDMAL), iminodimalic acid (IDM), ethylenediaminedifumaric acid (EDDF), ethylenediaminedimalic acid (EDDM), ethylenediaminedixtartahc acid (EDDT), ethylenediaminedimaleic acid and (EDDMAL), aminotri(methylenephosphonic acid) (ATMP). More preferably the chelating agent is selected from iminodisuccinic acid (IDS), ethylenediaminetetraacetic acid (EDTA) diethylenetriaminepentaacetic acid (DTPA), hydroxyethylenediaminetetraacetic acid (HEDTA), hydroxyethylethylenediaminetriacetic acid (HEEDTA), iminodifumaric (IDF), iminoditartaric acid (IDT), iminodimaleic acid (IDMAL), iminodimalic acid (IDM), ethylenediaminedifumaric acid (EDDF), ethylenediaminedimalic acid (EDDM), ethylenediaminedixtartaric acid (EDDT), ethylenediaminedimaleic acid (EDDMAL) and aminotri(methylenephosphonic acid) (ATMP).

The ability of the chelating agent to remove metal ions facilitates of the solution by preventing hardness (calcium) precipitation. The chelating agent may also serve to bind other metal ions that may adversely affect the effectiveness of the disinfecting components in the composition.

The chelating agent is preferably present in the composition in an amount of from about 0.01% to about 10%, such as from about 0.02% to about 1% based on weight of the composition.

The wiping composition of the present disclosure may optionally further contain corrosion inhibitors, complexing agents, auxiliaries, preservatives, fragrances, colorants and the like. Exemplary corrosion inhibitors include, for example, organic phosphorous compounds and blend of organic phosphorous compounds with a polymeric component. Exemplary auxiliaries include, for example, polyethylene glycol or other similar compounds. Examples of building salts that may be used include sodium metasilicate, sodium tripolyphosphate, sodium nitrilotriacetate, sodium carbonate, sodium silicate, citric acid salts and zeolites. Colorants and fragrances may be added provided they do not interfere with the function of the composition and may serve for identifying the composition. Generally, the optional further ingredients will make up less than about 20% by weight of the composition. For example, each of the above identified ingredients or components can be present in the composition generally in an amount from about 0.01% by weight to about 5% by weight. For instance, each of the above components can be present in the composition in an amount from about 0.1% to about 2% by weight, such as from about 0.3% to about 1% by weight. The optional additives are added in amounts conventionally used in sanitizing and disinfecting compositions.

The disinfectant wiping composition of the present disclosure can be supplied as a concentrate, which can be diluted prior to use. Alternatively, the disinfecting composition can be provided as a ready-to-use composition.

In one embodiment, when formulated as a concentrate, the wiping composition can contain a tertiary amine biocide in an amount from about 2% to about 50% by weight, such as in an amount from about 5% to about 35% by weight. Optionally, the composition can also contain a quaternary ammonium compound in an amount from about 5% to about 40% by weight, such as in an amount from about 5% to about 30% by weight. The concentrate can contain a chelating agent in an amount of from about 2% to about 15% by weight, such as in an amount of from about 3% to about 10% by weight and can contain an alkanolamine in an amount from about 0.5% to about 5% by weight, such as in an amount from about 1% to about 3% by weight. If one or more surfactants are present in the composition, the concentrate can contain a surfactant in an amount from about 2% to about 15% by weight, such as in an amount from about 3% to about 9% by weight. The remainder of the concentrate may comprise water. Water can be present in the composition, for instance, in an amount from about 20% to about 65% by weight, such as in an amount from about 50% to about 60% by weight. In one embodiment, the concentrate is formulated so as to have a dilution rate of from about 1% to about 5%, such as from about 1.5% to about 2%.

Various different microorganisms may be killed or controlled in accordance with the present disclosure. For instance, the wiping composition of the present disclosure can control gram positive bacteria, gram negative bacteria, and the like. In addition to bacteria, the anti-microbial composition of the present disclosure can also kill and control the growth of various other microorganisms, such as fungi, viruses, spores, yeast, mycobacteria, and the like.

When used as a hard surface cleaner, the disinfectant composition can be delivered to a surface to be cleaned, sanitized or disinfected by conventional means such as pouring the composition on a surface; a spray; which is applied to a surface via a spray means, including but not limited to, pump spray applicators, pressurized spray applicators and the like; a saturated wipe; a rag and a bucket; a mop and bucket; a sponge and a bucket; or via automated cleaning equipment and other similar and conventional ways to apply an anti-microbial or disinfectant composition to a surface for the purposes of sanitizing or disinfecting the surface.

To use the disinfectant composition of the present disclosure, a surface is treated with the substrate by spraying, pouring, wiping or otherwise applying the anti-microbial composition to the surface. Once applied to the surface, the anti-microbial composition is allowed to remain on the surface for a period of time. The anti-microbial composition may be applied to the surface and allowed to dry.

Surfaces, which may be disinfected with the compositions include, but are not limited to, those located in dairies, homes, health care facilities, canneries, food processing plants, restaurants, hospitals, institutions, and industry. Any suitable hard surface may be treated in accordance with the present disclosure, particularly frequently touched hard surfaces. The hard surface, for instance, can be made from glass, a metal such as an aluminum or stainless steel, a ceramic, a stone such as granite or marble, a plastic or polymer material, or the like. Specific areas targeted for application include hard surfaces in the home such as kitchen countertops, cabinets, appliances, waste cans, laundry areas, garbage pails, bathroom fixtures, toilets, water tanks, faucets, mirrors, vanities, tubs, and showers. The compositions can also be used to sanitize floors, walls, furniture, mirrors, toilet fixtures, windows, and wood surfaces, such as fence rails, porch rails, decks, roofing, siding, window frames, and door frames. Areas in hospitals would include beds, gurneys, tables, canisters, toilets, waste cans, stands, cabinets, shower stalls, floors, door knobs, bed rails, walls or any other non-porous surface.

One particularly useful application method is to impregnate the wiping composition into a wipe substrate. In this embodiment, the wipe is a single use wipe that is impregnated with the wiping composition and is stored in a container that will dispense the wipe to a user. The container with the wipes may contain a single wipe, or several wipes. Suitable containers include a pouch containing a single wipe, such as a moist towelette which is torn open by the user, or may be a pouch with a resealable opening containing several wipes in a stacked fashion, a rolled fashion or other suitable formation that would allow a single wipe to be removed from the opening at a time. Pouches are generally prepared form a fluid impervious material, such as a film, a coated paper or foil or other similar fluid impervious materials. In another way to dispense wipes of the present disclosure is to place the wipe in to a fluid impervious container having an opening to access the wipes in the container. Containers may be molded plastic container with lids that are fluid impervious. Generally, the lid will have an opening to access the wipes in the container. The wipe in the container may be in an interleaved stack, such that as a wipe is removed from the container, the next wipe is positioned in the opening of the container ready for the user to remove the next wipe. Alternatively, the wipe may be a continuous material which is perforated between the individual wipes of the continuous material. The continuous wipe material with perforations may be in a folded form or may be in a rolled form. Usually, in the rolled form, the wipe material is fed from the center of the rolled material. As with the interleaved stack, as a wipe is removed from the container, the next wipe is positioned in the opening to facilitate removal of the next wipe, when needed.

Disposable wipes provide advantages over other application vehicles, such as a reusable sponge, rag or the like. Unlike sponges, rags and the like, which are used repeatedly, the impregnated wipe is used a single time and disposed of. Reused sponges or rags present problems since the sponges or rags may carry microbes that are not easily killed by the disinfecting composition.

The wiping composition can be impregnated into the wipe such that the wipe is pre-moistened and will express or release the wiping composition onto the surface as the wipe is run across the surface to be treated. Generally, the wiping composition is saturated into the wipe such that the wipe will release the wiping composition to the surface through the wiping action. Generally, the wiping composition is used from about 2 parts to 6 parts by weight per 1 part by weight of the wiper substrate, more preferably from about 3 to about 5 parts by weight per 1 part by weight of the wiper substrate. In these ranges, complete saturation of the substrates can be achieved. It is noted that the amount of the wiping solution may go up or down to achieve complete saturation of the wipe substrate, depending on the particular wipe substrate.

Suitable wipe substrates include woven and nonwoven materials. Essentially any nonwoven web material may be used. Exemplary nonwoven materials may include, but are not limited to meltblown, coform, spunbond, airlaid, hydroentangled nonwovens, spunlace, bonded carded webs, and laminates thereof. Optionally, the nonwoven may be laminated with a film material as well. The fibers used to prepare the wipe substrate may be cellulosic fiber, thermoplastic fibers and mixtures thereof. The fibers may also be continuous fibers, discontinuous fibers, staple fibers and mixtures thereof. Basis weights of the nonwoven web may vary from about 12 grams per square meter to 200 grams per square meter or more.

In one embodiment the wipe is impregnated with a liquid component containing both active and inert ingredients within the allowable tolerance levels and the wiping composition expressed from the wipe contains active ingredients within the allowable tolerance levels. Once applied to the surface, the antimicrobial wiping composition is allowed to remain on the surface for a period of time. As mentioned, it has been unexpectedly found that the described wiping composition has dramatically reduced contact times necessary for killing the targeted microorganisms.

Figure 2:
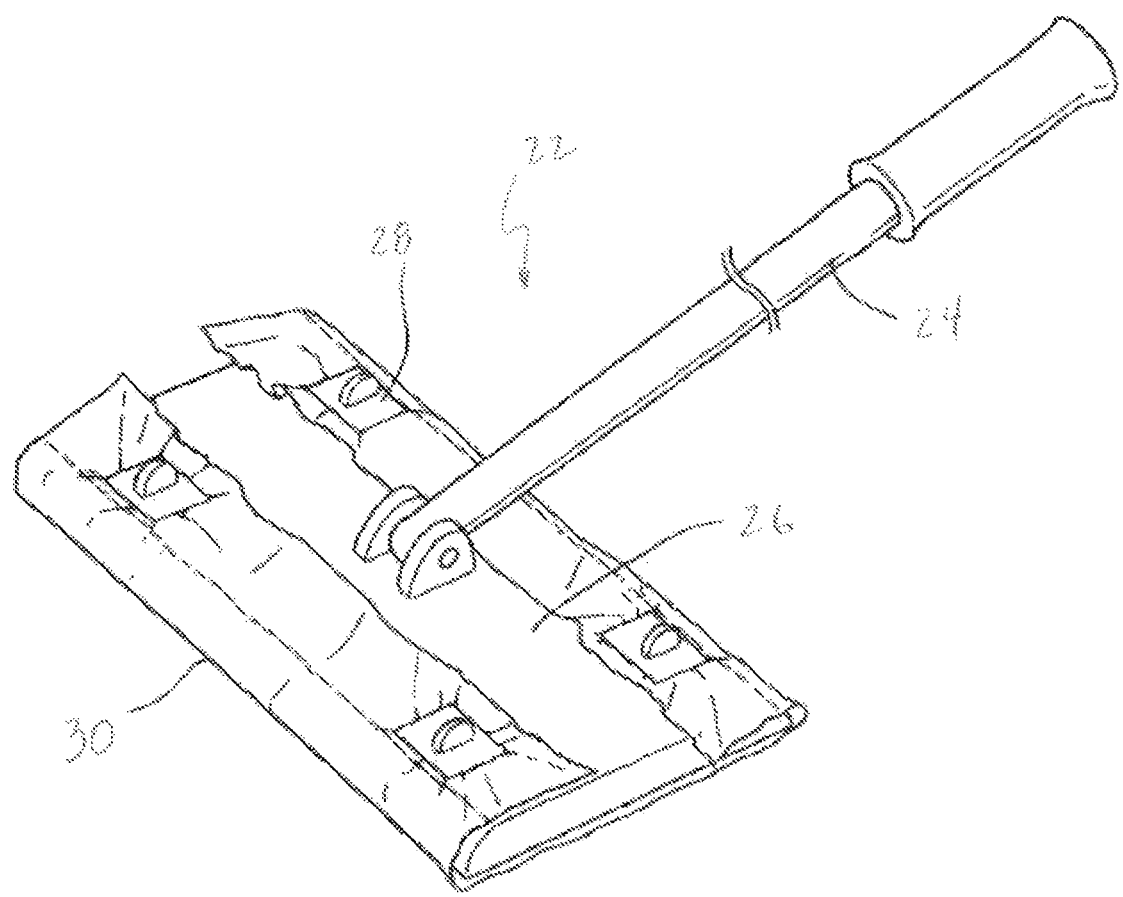
FIG. 2 is a perspective view of another embodiment of a wiping product made in accordance with the present disclosure.

Referring to FIGS. 1 and 2, exemplary embodiments of wiping products made in accordance with the present disclosure are illustrated. Referring to FIG. 1, for instance, a wiping product 10 is illustrated. The wiping product 10 includes a dispenser 12. The dispenser 12 includes a bottom 14 and a top 16. The top 16 defines an opening or slot 18 through which premoistened wipes are dispensed. The premoistened wipes can be contained in the dispenser 12 as a single roll of material or can be stacked as individual wipes. The wipes 20 are for cleaning any suitable hard surface and can be presaturated or premoistened with the wiping composition of the present disclosure as described above.

Referring to FIG. 2, an alternative embodiment of a wiping product 22 is illustrated. The wiping product 22 as shown in FIG. 2 is particularly well suited for cleaning floors. As described above, for instance, the wiping composition of the present disclosure can be formulated for application to floors without harming or adversely interfering with a floor coating or floor finish.

As shown in FIG. 2, the wiping product 22 includes a handle 24 attached to a substrate holder 26. The substrate holder 26 includes a plurality of attachment devices 28 that are designed to engage and attach to a premoistened wipe 30. The premoistened wipe 30 includes a liquid absorbent substrate that has been saturated or wetted with the wiping composition of the present disclosure.

The following examples are intended to provide a more complete understanding of the present invention. The examples are not intended, however, to limit the invention.

EXAMPLES

Various different disinfectant compositions were formulated and tested for streaking and other properties.

In Table 1, the formulas were loaded onto wipe substrates with a 4 part liquid and 1 part wipe (4:1) loading ratio. The wipe substrates were then wiped on black glass plates or mirrors and allowed to dry. The substrates were visually examined for streaking and graded from low to medium to high.

TABLE 1

Streaking performance

| Ingredients | Sample No. 1 (Wt. %) | Sample No. 2 (Wt. %) | Sample No. 3 (Wt. %) | Sample No. 4 (Wt. %) | Sample No. 5 (Wt. %) | Sample No. 6 (Wt. %) |
|---|---|---|---|---|---|---|
| N,N-bis(3-aminopropyl) dodecylamine | | 0.100 | 0.500 | 0.420 | 0.550 | 0.420 |
| Alky dimethyl benzyl and dialkyl dimethyl ammonium chloride | 0.500 | 0.400 | | 0.100 | | |
| Dodecyl dimethyl ammonium bicarbonate/carbonate | | | | | | 0.100 |
| Tetrasodium EDTA | 0.053 | 0.053 | 0.053 | 0.053 | 0.053 | 0.023 |
| Monoethanolamine | 0.026 | 0.026 | 0.026 | 0.026 | 0.026 | 0.026 |
| Ethoxylated alkyl (C12-14) alcohol | 0.105 | 0.105 | 0.105 | | | |
| DI Water | q.s. | q.s. | q.s. | q.s. | q.s. | q.s. |
| Streaking | High | Medium to high | None | Low | None | Low |

As shown above, wiping compositions containing a tertiary amine unexpectedly and dramatically produced less streaking than compositions containing a quaternary ammonium compound.

As described above, wiping compositions made according to the present disclosure can be formulated into concentrates and then diluted prior to use. Examples of concentrate formulations are shown in Table 2 below.

TABLE 2

Examples of concentrate formulations

| Ingredients | Sample No. 7 | Sample No. 8 | Sample No. 9 | Sample No. 10 | Sample No. 11 |
|---|---|---|---|---|---|
| N,N-bis(3-aminopropoyl) dodecylamine | 5.71 | 28.55 | 24.00 | 31.43 | 24.00 |
| Alky dimethyl benzyl and dialkyl dimethyl ammonium chloride | 28.57 | | 7.14 | | |
| Dodecyl dimethyl ammonium bicarbonate/carbonate | | | | | 11.43 |
| Tetrasodium EDTA | 8.00 | 8.00 | 8.00 | 8.00 | 3.43 |
| Monoethanolamine | 1.50 | 1.50 | 1.50 | 1.50 | 1.50 |
| Ethoxylated alkyl (C12-14) alcohol | 6.00 | 6.00 | | | |
| DI Water | 50.22 | 55.95 | 59.36 | 59.07 | 59.64 |
| Total | 100.00 | 100.00 | 100.00 | 100.00 | 100.00 |
| Dilution rate | 1.75% | 1.75% | 1.75% | 1.75% | 1.75% |

Micro-Efficacy Testing

The antimicrobial efficacy against *S. aureus* was evaluated for wipes impregnated with various samples from Table 1. The testing was performed in accordance with the protocols outline in AOAC official method 961.02 Germicidal Spray products as Disinfectants, modified for use with wipes (Revised 2012); Standard Operating Procedure for Disinfectant Towelette Test Against *Staphylococcus aureus, Pseudomonas aeruginosa*, and *Salmonella enterica*. EPA MB-09-05 (revised 2013). The test formulations passed the efficacy test against *S. aureus* (Table 3).

TABLE 3

Micro testing results against *S. aureus* with 60 second contact time

| Formulations | Sample No. 1 | Sample No. 2 | Sample No. 3 | Sample No. 5 | Sample No. 6 |
|---|---|---|---|---|---|
| AOAC Modified GST Micro testing results against *S. aureus**  | 0/60 Pass | 1/60 Pass | 0/60 Pass | 0/60 Pass | 1/60 Pass |

*Performance standard for bactericidal activity is ≤1 positive carrier out of 60 for *S. aureus*.

Some of the formulations were further tested against *P. aeruginosa* using the same test protocol, and the formulations passed the test. The results are shown in Table 4.

TABLE 4

Micro testing results against *P. aeruginosa* with 60 second contact time

| Formulations | Sample No. 1 | Sample No. 2 | Sample No. 5 | Sample No. 6 |
|---|---|---|---|---|
| AOAC Modified GST Micro testing results against *P. aeruginosa** | 0/60 Pass | 0/60 Pass | 1/60 Pass | 1/60 Pass |

*Performance standard for bactericidal activity is ≤1 positive carrier out of 60 for *P. aeruginosa*.

The tertiary amine biocide was then formulated with various organic solvents and tested for efficacy against mycobacteria. The liquid formulations were evaluated for the efficacy against mycobacteria (*M. terrae*) using OECD Quantitative methods for evaluating the activity of Microbicides used on hard Non-Porous Surfaces. Two antimicrobial formulations were made in accordance with the present disclosure. For purposes of comparison, Sample No. 14 was also tested which is a water-based and organic solvent free product.

TABLE 5

| | Sample No. 12 | Sample No. 13 | Sample No. 14 | Sample No. 15 |
|---|---|---|---|---|
| N,N-bis(3-aminopropoyl) dodecylamine | 0.500 | 1.000 | 1.4 | 0.500 |
| Alky dimethyl benzyl and dialkyl dimethyl ammonium chloride | 0.500 | | | |
| N,N-Didecyl-N-methyl-poly(oxyethyl)ammonium propionate | | | 1.26 | |
| Tetrasodium EDTA | 0.053 | 0.053 | | |
| Monoethanolamine | 0.434 | 0.434 | | |
| Sodium hydroxide | | | | 0.030 |
| Sodium carbonate | | | | 0.080 |
| Ethoxylated alkyl (C12-14) alcohol | 0.102 | 0.102 | | 0.100 |
| Dipropylene glycol n-propyl ether | 9.250 | 9.250 | | 9.000 |
| Ethylene glycol phenyl ether | 2.000 | 2.000 | | 1.000 |
| Isopropyl | 25.000 | 25.000 | | |
| DI Water | q.s. | q.s. | q.s. | q.s. |

TABLE 6

Micro efficacy test results against *M. terras* at 3 min. contact time

| Test samples | Average $Log^{10}$ Survivors | Average $Log^{10}$ Reduction* | Average $Log^{10}$ Control |
|---|---|---|---|
| Sample No. 12 | 0 | 6.09 | 6.09 |
| Sample No. 13 | 0 | 6.09 | 6.09 |
| Sample No. 14 | >3.48 | <2.41 | 5.89 |
| Sample No. 15 | 0 | 6.62 | 6.62 |

*Performance standard for Tuberculocidal for this example is a minimum of 5 Log10 reduction in selected contact time.

As shown above, Sample Nos. 12, 13 and 15 containing glycol ether solvents and isopropyl alcohol and/or ethanol exhibited much greater efficacy against mycobacteria.

Sample Nos. 12 and 13 were loaded onto wipe substrates with a 4:1 loading ratio. The efficacy of the wipes was tested based on the methodology of the AOAC Tuberculocidal Activity Method as modified by the ASTM International Standard Practice for Evaluation of Pre-saturated or Impregnated Towelettes for Hard Surface Disinfection (E2362-09). The organism studied was *Mycobacterium bovis*-BCG and the test contact time was 3 minutes. The efficacy of the formulation was evaluated by counting the visible number of carriers showing growth of *Mycobacterium bovis*-BCG in primary subcultures (in MPB medium) and secondary sub-cultures (in 7H9 and KM media) following a three minutes exposure to the formulation at room temperature in the presence of a 5% fetal bovine serum organic soil load. Table 7 demonstrates the test results of wipes impregnated with the test formulas. As can be seen, the testing of the wipes impregnated with the wiping compositions passed the test, with no recovery of the *Mycobacterium bovis*-BCG at 3 minute contact time.

TABLE 7

Test results against *Mycobacterium bovis*-BCG at a contact time of 3 min.

| Wipes impregnated with | Subculture Media | Total No. Carriers/Tubes | Number Positive 30 days | 60 days | 90 days |
|---|---|---|---|---|---|
| Sample No. 12 | MPB | 10 | 0 | 0 | 0 |
| | 7H9 | 10 | 0 | 0 | 0 |
| | KM | 10 | 0 | 0 | 0 |
| Sample No. 13 | MPB | 10 | 0 | 0 | 0 |
| | 7H9 | 10 | 0 | 0 | 0 |
| | KM | 10 | 0 | 0 | 0 |

Because the wiping composition of the present disclosure has dramatically low streaking characteristics, the wiping composition is well suited for disinfecting floor surfaces. Table 8 below, for instance, provides other embodiments of wiping compositions made in accordance with the present disclosure that are particularly well suited for disinfecting floors.

TABLE 8

| Ingredients | Sample No. 16 | Sample No. 17 | Sample No. 18 |
|---|---|---|---|
| N,N-bis(3-aminopropyl) dodecylaroine | 0.28 | 0.165 | 0.22 |
| Alkyl trimethyl quaternary ammonium surfactant (35%) | 0.30 | 0.30 | 0.30 |
| Cocamine oxide surfactant (30%) | 0.10 | 0.10 | 0.10 |
| Propylene glycol n-butyl ether (PnB) | 0.15 | 0.15 | 0.15 |
| EDTA acid | 0.06 | 0.06 | 0.06 |
| Lactic acid | 0.12 | 0.08 | 0.105 |
| DI Water | 98.99 | 99.145 | 99.065 |
| Total | 100.00 | 100.00 | 100.00 |
| pH | 8.00 | 7.32 | 7.32 |

Micro-Efficacy Testing

Sample Nos. 16, 17 and 18 were loaded into wipe substrates and tested in accordance with AOAC Official Method 961.02 as described above. The wipes were tested against *S. aureus, P. aeruginosa* and *S. enterica*. All of the samples passed the efficacy test at a five minute contact time as shown below.

TABLE 9

Micro testing results against *S. aureus, P. aeruginosa* or *S. enterica* with 5 minute contact time

| Organisms | Sample No. 16 | Sample No. 17 | Sample No. 18 |
|---|---|---|---|
| *S. aureus** | 0/60 Pass | 0/60 Pass | 1/60* Pass |
| *P. aeruginosa* | 0/60 Pass | — | — |
| *S. enterica* | — | 0/60 Pass | 0/60 Pass |

Performance standard for bactericidal activity is ≤1 positive carrier out of 60 for *S. aureus, P. aeruginosa* and *S. enterica*

Three batches of Sample No. 16 were loaded onto wipe substrates with a 7.0 loading ratio. The efficacy of the wipes was tested based on the methodology described previously of Pre-Saturated Towelettes for Hard Surface Disinfection against *S. aureus, P. aeruginosa* and *S. enterica*. The test results are shown in Table 10.

TABLE 10

Micro testing results against *S. aureus, P. aeruginosa* and *S. enterica* with 5 minute contact time

| Organisms | Sample No. 16 Batch 1 | Sample No. 16 Batch 2 | Sample No. 16 Batch 3 |
|---|---|---|---|
| *S. aureus** | 1/60 Pass | 0/60 Pass | 1/60* Pass |
| *P. aeruginosa* | 0/60 Pass | 0/60 Pass | 0/60 Pass |
| *S. enterica* | 1/60 Pass | 0/60 Pass | 0/60 Pass |

Performance standard for bactericidal activity is ≤1 positive carrier out of 60 for *S. aureus, P. aeruginosa* and *S. enterica*

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A wiping composition for disinfecting surfaces, the wiping composition comprising:

a biocide, the biocide comprising a tertiary amine present in the wiping composition in an amount of about 0.05% to about 2% by weight, a liquid carrier, the liquid carrier comprising water present in the wiping composition in an amount greater than about 20%, at least one of a chelating agent or a pH adjustor, and at least one alcohol consisting of alcohols selected from the group consisting of glycol ethers, evaporating agents, fatty alcohols, and alkanolamines, wherein the glycol ether is selected from the group consisting of: diethylene glycol propyl ether, ethylene glycol monomethyl ether, ethylene glycol monoethyl ether, ethylene glycol monopropyl ether, ethylene glycol monoisopropyl ether, ethylene glycol monobutyl ether, diethylene glycol monomethyl ether, diethylene glycol monobutyl ether, diethylene glycol monoethyl ether, diethylene glycol n-butyl ether, ethylene glycol dimethyl ether, ethylene glycol diethyl ether, ethylene glycol dibutyl ether, propylene glycol n-butyl ether, propylene glycol n-propyl ether, tripropylene glycol methyl ether, dipropylene glycol methyl ether, dipropylene glycol butyl ether, dipropylene glycol n-propyl ether, ethylene glycol hexyl ether, and combinations thereof; wherein the evaporating agent is selected from the group consisting of: ethanol, propanol, isopropanol, and combinations thereof; and wherein the fatty alcohol is selected from alkoxylated fatty alcohols; and combinations thereof, wherein the at least one alcohol includes the glycol ether, wherein the glycol ether is present in the wiping composition in an amount greater than about 2 wt. %, wherein the wiping composition is free of quaternary ammonium compounds; and wherein the wiping composition exhibits a 5 $Log^{10}$ or greater reduction of *M. terrae* at a 3 minute contact time.

2. A wiping composition as defined in claim 1, wherein the wiping composition is effective against *S. aureus, P. aeruginosa, M. terrae*, or *M. bovis* at a three minute contact time when tested according to AOAC Method 1.02 (Revised 2012).

3. A wiping composition as defined in claim 1, wherein the wiping composition is effective against *S. aureus, P. aeruginosa*, or *S. enterica* at a five minute contact time when tested according to AOAC Method 1.02 (Revised 2012).

4. A wiping composition as defined in claim 1, wherein the wiping composition is effective against *S. aureus, P. aeruginosa, M. terrae*, or *M. bovis* at a one minute contact time when tested according to AOAC Method 1.02 (Revised 2012).

5. A wiping composition as defined in claim 1, wherein the composition has a pH greater than 10.

6. A wiping composition as defined in claim 1, wherein the composition has a pH of from about 6.5 to about 9.

7. A wiping composition as defined in claim 1, wherein the wiping composition is low streaking.

8. A wiping composition as defined in claim 1, wherein the tertiary alkyl amine has an alkyl chain length from C6 to C16.

9. A wiping composition as defined in claim 1, wherein the biocide comprises N, N-bis(3-aminopropyl) dodecylamine, N-(3-aminopropyl)-N-dodecylpropane-1,3-diamine, N-(3-aminopropyl)-N-decyl-1,3-propanediamine, N-(3-aminopropyl)-N-tetradecyl-1,3-propanediamine, or mixtures thereof.

10. A wiping composition as defined in claim 1, wherein the glycol ether includes dipropylene glycol n-propyl ether.

11. A wiping composition as defined in claim 1, wherein the evaporating agent is present in the composition in an amount from about 1% to about 60% by weight.

12. A wiping composition as defined in claim 5, wherein the wiping composition contains the pH adjustor and wherein the pH adjustor comprises an alkanolamine, a hydroxide, or mixtures thereof.

13. A wiping composition as defined in claim 6, wherein the wiping composition contains the pH adjustor and wherein the pH adjustor comprises an organic acid.

14. A wiping composition as defined in claim 1, wherein the composition contains the chelating agent in combination with the pH adjustor.

15. A wiping composition as defined in claim 1, wherein the composition contains a further surfactant.

16. A wiping composition as defined in claim 15, wherein the further surfactant contains a nonionic surfactant comprising an amine oxide.

17. A premoistened wiping product comprising;
a liquid absorbent substrate; and
a wiping composition as defined in claim 1.

18. A premoistened wiping product as defined in claim 17, wherein the product further includes a handle attached to a substrate holder, the liquid absorbent substrate being retained on the substrate holder for application to floors.

* * * * *